(12) United States Patent
Jakob (10) Patent No.: US 9,958,029 B2
(45) Date of Patent: May 1, 2018

(54) DEVICE FOR LINKING CONVEYOR BELTS (71) Applicant: ASER, St Chamond (FR)

(72) Inventor: Horst Jakob, Deaux (FR)

(73) Assignee: ASER, St. Chamond (FR)

( * ) Notice: Subject to any disclaimer, the term of this patent is extended or adjusted under 35 U.S.C. 154(b) by 0 days. days.

(21) Appl. No.: 15/445,712

(22) Filed: Feb. 28, 2017

(65) Prior Publication Data

US 2017/0241511 A1   Aug. 24, 2017

Related U.S. Application Data

(63) Continuation of application No. PCT/FR2015/052334, filed on Sep. 3, 2015.

(30) Foreign Application Priority Data

Sep. 4, 2014 (FR) .................... 14 02007

(51) Int. Cl.
*F16G 3/08* (2006.01)
*F16G 3/02* (2006.01)

(52) U.S. Cl.
CPC .................... *F16G 3/08* (2013.01); *F16G 3/02* (2013.01)

(58) Field of Classification Search
CPC ... B65G 17/00; F16G 3/00; F16G 3/02; F16G 3/04; F16G 3/10; F16G 3/12; F16G 3/08
USPC ............... 198/844.2; 474/255, 257
See application file for complete search history.

(56) References Cited

U.S. PATENT DOCUMENTS

| | | | | |
|---|---|---|---|---|
| 3,546,054 A | * | 12/1970 | Ross | F16G 3/10 198/844.2 |
| 3,625,809 A | | 12/1971 | Caroselli et al. | |
| 4,344,209 A | * | 8/1982 | Harwood | F16G 3/02 198/844.2 |
| 5,573,470 A | * | 11/1996 | Jakob | F16G 3/00 198/844.2 |
| 5,839,571 A | | 11/1998 | Jakob | |
| 6,601,698 B2 | * | 8/2003 | Jakob | F16G 3/00 198/844.2 |
| 2009/0266686 A1 | * | 10/2009 | Lechner | B01D 29/093 198/844.2 |

FOREIGN PATENT DOCUMENTS

| | | |
|---|---|---|
| FR | 2743611 | 7/1997 |
| FR | 2803836 | 7/2001 |

OTHER PUBLICATIONS

International Search Report for International Application PCT/FR2015/052334, dated Dec. 14, 2015.

* cited by examiner

*Primary Examiner* — James R Bidwell
(74) *Attorney, Agent, or Firm* — Burris Law, PLLC (57) ABSTRACT

A device for linking a conveyor belt includes an upper plate and a lower plate. The upper plate includes a highly extendable armature and the lower plate includes an inextensible or quasi inextensible armature. The two plates can be fastened onto the ends of a conveyor belt inserted between the two plates, which as such transforms this conveyor belt into an endless belt.

6 Claims, 6 Drawing Sheets

DEVICE FOR LINKING CONVEYOR BELTS

CROSS-REFERENCE TO RELATED APPLICATIONS

This application is a continuation of International Application No. PCT/FR2015/052334, filed on Sep. 3, 2015, which claims the benefit of FR 14/02007, filed on Sep. 4, 2014. The disclosures of the above applications are incorporated herein by reference.

FIELD

The present disclosure relates to conveyor belts, used for transporting various materials or various products, such as coal, ore, industrial or agricultural products.

BACKGROUND

The statements in this section merely provide background information related to the present disclosure and may not constitute prior art.

These conveyor belts consist of belts made of a reinforced elastomer, or of a reinforced synthetic material, of a suitable length and width, of which the ends must be connected together, before mounting, or after mounting, on devices for supporting and driving that comprise deflection rollers and idler rollers. Often these devices also comprise members for tensioning, that have for purpose to keep the conveyor belt taught.

Until now various means have been used to carry out this connection of the ends of conveyor belts. At the outset, and still today, vulcanisation is used when the belt is constituted of a reinforced elastomer that can be vulcanised. After preparatory work intended to create in each end sorts of degrees that are respectively complementary that apply to one another when said ends are brought close to one another, the vulcanisation is carried out with the adding of heat and pressure such as is well known. An alternative to vulcanisation is cold gluing.

Another known means of connecting consists in using staples with a general U-shape, cut out from a metal sheet, said staples comprise upper plates and lower plates connected by knuckles, with these staples being fastened in two series astride on each one of the ends of the conveyor belt to be connected, in such a way that the knuckles overhang and that those of one series can be nested between the knuckles of the other series, with a connecting and articulating rod then being passed inside the knuckles nested in such a way as to connect as such the two ends by forming a sort of hinge. The known means used to fasten the staples onto the ends of the conveyor belt consist of means for fastening with a stem such as clamps, rivets and screws.

In a more recent past, devices for linking have been proposed that make use of flat connection elements made of reinforced elastomer or of reinforced synthetic material, arranged respectively on one side and on the other side of the ends of the conveyor belt and fastened onto said ends that are to be connected. An example of such devices for linking is given by U.S. Pat. No. 5,839,571, wherein the armatures consist of crossed sets of cables. These devices comprise an upper plate and a lower plate, as well as a central portion that connects the two plates. However, col. 8 l. 12 to 17, the same patent considers limiting the device to two plates, an upper plate and a lower plate.

SUMMARY

By convention in all of the text of this application the term "upper" applied to a part or to a portion of a part, shall mean located opposite rollers of the device for supporting and driving the conveyor belt. The term "lower" applied to a part or to a portion of a part shall mean located on the side of the conveyor belt that is in contact with the rollers of the device for supporting and driving the conveyor belt. Likewise, applied to devices for linking, the term "outer" will be used to designate the space oriented opposite the rollers and the term "inner" will be used to designate the space oriented on the side of the rollers. These notions are therefore independent of the visual position of the conveyor belt, whether considering the upper run of the conveyor belt or whether considering the lower run of the conveyor belt in service.

Also by convention, the term "armature" shall apply to flat elements, most often unique in each plate of the device for linking, but able for several to be present, the term highly extendable characterising the property of extendability of each element of the armature and the term inextensible characterising the inextensibility of each element of the armature. This convention shall apply to the description as well as to the claims and to the descriptive abstract.

With regards precisely to the armatures, the inventor of the present disclosure has noticed that during the passage on the rollers, in particular the deflection rollers, an extension of the upper face of the conveyor belt is produced in the longitudinal direction and a compression of the lower face of the conveyor belt in the longitudinal direction, with this extension and this compression being transmitted to the upper plate of the device for linking and respectively to the lower plate, of the device for linking.

These distortions can be detrimental to the duration of use of the links. A stoppage of a conveyor belt not only generates repair fees but also the corresponding loss in production of the industrial facility of which it is a part.

That is why in prior patents, in particular in U.S. Pat. No. 5,839,571, in the name of Jakob, the inventor of this application proposed to provide the armatures of the upper plates and those of the lower plates with identical properties of extendability and with identical properties of compressibility for the purpose of handling the issue posed by the difference in travel which occurs during the passage of the rollers, mentioned hereinabove.

However, assisted by experience in the field, the inventor of this the present disclosure has observed that the effects of the measurements taken on the armatures of the upper plates and of the lower plates, were not used for an increased benefit. Indeed, because the armature of the lower plates and that of the upper plates were provided with the same properties of extendability, the extension differential created between the extension of the upper plate and that of the lower plate during the passage on the deflection rollers, was insufficient, especially in the presence of members for tensioning, in which a decreased transmission of forces and could result in a deterioration of the armature of the upper plate subjected to extensions of an excessive extent.

The present disclosure concerns particular and new arrangements as well as on particular and new properties, of the armatures of the upper plates of devices for linking and on those of their lower plates, whether or not these plates are connected by a central portion and that this central portion when it exists is, or is not connected to the plates being integral with the latter or by being added. These improvements have for purpose to improve the service life of devices for linking in service in particular in the case of cumbersome installations.

The present disclosure also provides an arrangement of the armatures that makes it possible to make devices for linking able to be mounted on conveyor belts of different thicknesses.

After the execution of practical tests, the inventor of this the present disclosure obtained excellent results by providing the upper plate with an armature of which the properties of extendability and of compressibility contrast sharply with those of the armatures of the lower plate. In other terms, this the present disclosure includes a device for linking conveyor belts comprising two linking elements that have the form of plates made of elastomer or of a synthetic material, with the plates comprising armatures, one of the plates, referred to as the upper plate, being, during use, arranged against the outer face of the ends of the conveyor belt and the other plate, referred to as the lower plate, being, during use, arranged against the inner face of the ends of the conveyor belt, the two plates being, during the use of the device for linking, subjected to the ends of the conveyor belt using known means, remarkable in that the device for linking is provided with armatures of which the properties of extendability and of compressibility, in the horizontal direction, differ, according to their arrangement in the device for linking, and in that the limit of extendability of the highly extendable armatures under the effect of the forces of traction is not reached before, under the effect of equivalent forces of traction, the rupture of the inextensible or quasi inextensible armatures occurs.

Generally, and in the scope of the present disclosure, the term "highly extendable" means that the extendability of the armature is at least greater than about 15%, and in one form even greater than about 20%. In the same way, the term "inextensible, or quasi inextensible" means that the increased extendability of the armature does not exceed about 3%. In this way, it is understood that the properties of extendability and of compressibility of armatures differ, in particular sharply.

A first combination of armatures has been tried and has given excellent results. In this combination the upper plate was provided with a highly extendable armature. The extendability of this armature can commonly range up to 20% of the initial length before application of force in the longitudinal direction, i.e. the direction of travel of the conveyor belt, once the device for linking is mounted. The extendability can moreover be, if desired, much greater, for example up to 60%. In one form, the extendability of the highly extendable armature is between 15% and 60% and in another form between 20% and 60%. The lower plate is provided with an inextensible, or quasi inextensible, armature, with its increased extendability not exceeding about 3%.

Due to the strong contrast, the extension differential at the passage of the rollers is increased but the extension of the extendable armature of the upper plate does not reach its possible maximum before the rupture of the inextensible or quasi inextensible armature of the lower plate. As the transmission of the traction forces is provided by the armature of the lower plate the resistance to the rupture of the latter is chosen according to the uses provided for the conveyor belt, with a safety coefficient. It is understood that the probability of fatigue or of a deterioration of the device for linking is as such greatly reduced. Note that this version of the present disclosure can be applied to various devices for linking with the condition that they comprise an upper plate and a lower plate, and that, whether or not there is a central portion that connects the two plates and that if one does exist it is integral with the two plates or is added.

The present disclosure further proposes a decisive solution relating to the adaptability of devices for linking to different conveyor belt thicknesses. In this solution, the upper plate and the lower plate are connected by forming a single part with a central connecting portion arranged diagonally. This arrangement combines the adaptability of the device for linking with the mounting on conveyor belts of different thicknesses and the properties of armatures concerning the extendability and the compressibility of the armatures in the longitudinal direction of the conveyor belt.

Said central connecting portion is constituted of an inextensible or practically inextensible canvas coated with elastomer. This connecting portion is arranged at an angle between the upper plate and the lower plate and is integral on the one hand with the upper face of a side of the lower plate and on the other hand with the lower face of the upper plate, on the side opposite the upper plate. The inextensible or quasi inextensible canvas coated with elastomer of the central connecting portion is extended on one side over the lower face of the upper plate with which it is integral and on the other side with the upper face of the lower plate, with which it is integral.

This arrangement makes it possible to use the properties of inextensibility, or of quasi inextensibility of this third armature common to the two plates, but in addition to the fact that the connecting zones between the central connecting portion and the upper face of the lower plate on the one hand and the lower face of the upper plate on the other hand constituent pseudo-hinges, it allows for a clearance that makes it possible to separate, or to approach, the upper plate and the lower plate, as such making it possible to mount devices for linking of this version on conveyor belts of different thicknesses.

In addition, note that the devices for linking of this version can be reversed, i.e. they can be mounted indifferently by inverting the upper plate and the lower plate, which therefore inhibits the possibility of an erroneous mounting, with the properties of substantial extendability and those of zero or quasi zero extendability, being retained.

The inventor has also provided that the inextensible, or quasi inextensible armatures used in the various forms can be constituted of canvases of the type of those used in machines for manufacturing paper wherein they are used as screens and support for transporting the paper being formed and which are constituted of a weaving of inextensible, or quasi-inextensible metal cables, of inextensible, or quasi-inextensible metal wires, or of inextensible, or quasi-inextensible filaments made of synthetic material. As these canvases mounted as armatures of plates of the device for linking according to the present disclosure would possibly be subjected to a combing effect, the inventor provided that in the case of the presence of means for fastening with a stem such as clamps, rivets, screws, the edges of these fabrics, i.e. the edges of the textile used for making the inextensible, or quasi inextensible armatures, be, in the devices for linking according to the present disclosure, arranged perpendicularly to the direction of travel of the conveyor belt which is that of the device for linking mounted on the conveyor belt.

DRAWINGS

In order that the disclosure may be well understood, there will now be described various forms thereof, given by way of example, reference being made to the accompanying drawings, in which.

Further areas of applicability will become apparent from the description provided herein. It should be understood that the description and specific examples are intended for purposes of illustration only and are not intended to limit the scope of the present disclosure.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
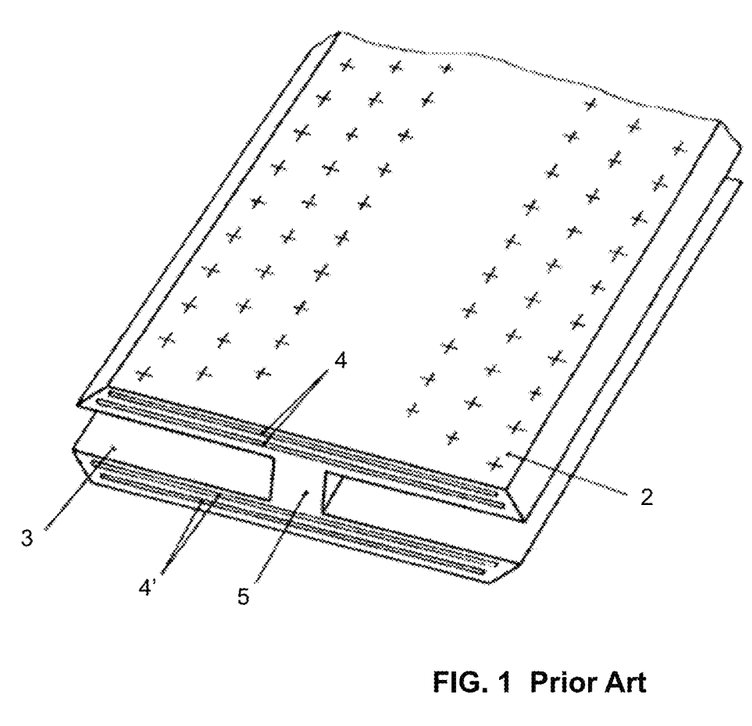
FIG. 1 shows a device for linking of prior art, seen in perspective and as a cross-section.

FIG. 1 shows a device for linking of prior art. Note an upper plate 2 reinforced in this case by parallel, superposed and crossed sets 4 of cables, and a lower plate 3 reinforced in the same way as the upper plate by sets 4'. Optionally, as mentioned hereinabove, a central portion 5 connects the lower plate and the upper plate.

Figure 2:
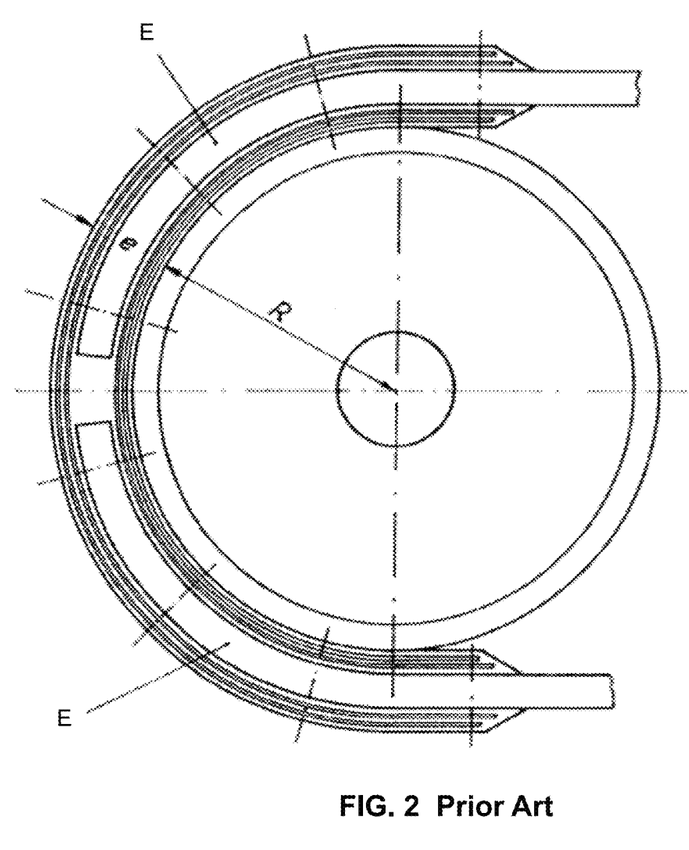
FIG. 2 shows the same device for linking of prior art mounted on the ends of a conveyor belt, passing on a deflection roller.

FIG. 2 shows the device for linking of FIG. 1 mounted on a conveyor belt, during the passage on a roller. Note the roller of radius R, the ends E of the conveyor belt, the lower plate and the upper plate provided with armatures. The distance between the upper face of the upper plate and the lower face of the lower plate is dimensioned e. It is understood that the difference in travel is roughly calculated according to the formula $$\Delta \text{travel} = [2\pi(R+e) - 2\pi R]\frac{180}{360} \text{ or } \pi(R+e) - \pi R$$

with the travel taking place only over about 180°, not 360°.

Figure 3:
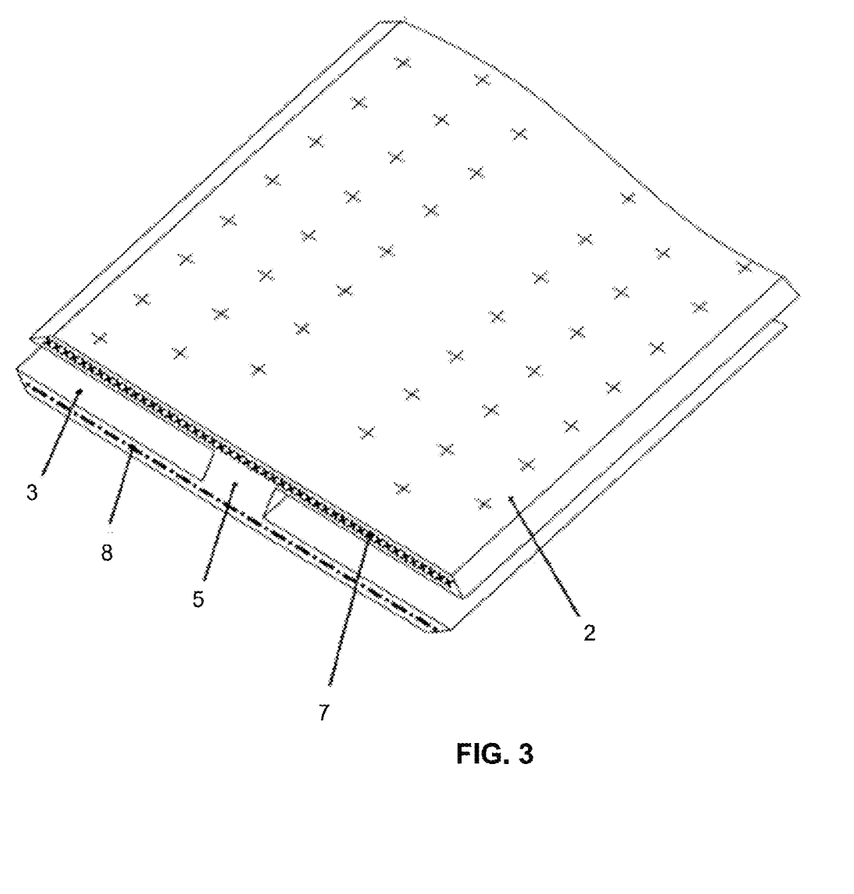
FIG. 3 shows, in perspective, a first device for linking according to the present disclosure.

FIG. 3 shows a first device for linking according to the present disclosure, as a longitudinal cross-section. The various elements are shown as follows:

(2) upper plate
(3) lower plate
(5) central portion (recall that the central portion may either not exist, or is integral with the plates, or is added).
(7) armature extendable and compressible in the longitudinal direction
(8) inextensible or quasi inextensible armature.

It is understood that as the armature 8 of the lower plate 3 is inextensible, the effect of the difference in travel applies entirely to armature 7, highly extendable, of the upper plate 2. As the increased extension of the extendable armature is not reached before the inextensible armature reaches its limit of rupture the highly extendable armature may not be subjected to forces of traction that, otherwise, could result in deteriorating it. As the inextensible armature has been given resistances to rupture that are compatible with the forces of traction that are exerted during the operation of the conveyor belt, with of course a safety coefficient, the inextensible armature, for the transmission of force, is used as a fuse". As such the two armatures are sheltered from deterioration and the service longevity of the device for linking is increased.

With regards to the resistance to rupturing of the inextensible armature compatible with the forces of traction that are exerted during the operation of the conveyor belt, it is understood that the latter is chosen freely by those skilled in the art according to the desired application. An inextensible armature will as such be used having a relatively low resistance for a device for linking for a light and thin conveyor belt, for example intended to transport food products, and an inextensible armature will be used having a relatively high resistance in the case of a device for linking for a heavy conveyor belt, for example intended to transport ore.

Figure 4:
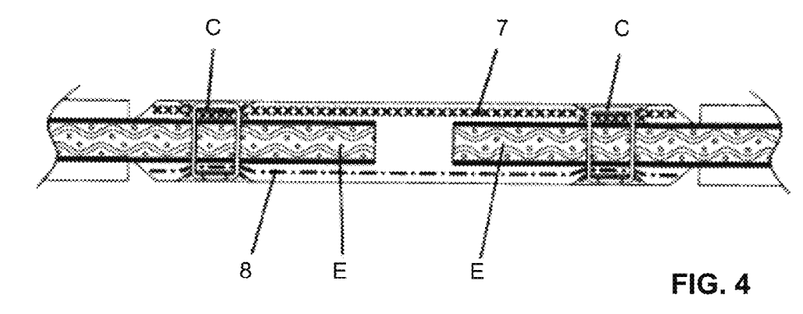
FIG. 4 shows, as a longitudinal cross-section, the device for linking of FIG. 3, mounted on the end of a conveyor belt.

FIG. 4 shows, as a longitudinal cross-section, the device for linking of FIG. 3, mounted on the end of a conveyor belt. The armature of the upper plate 7, extendable, the inextensible, or quasi inextensible armature 8 of the lower plate are found. The fastening is provided here by clamps C.

Figure 5:
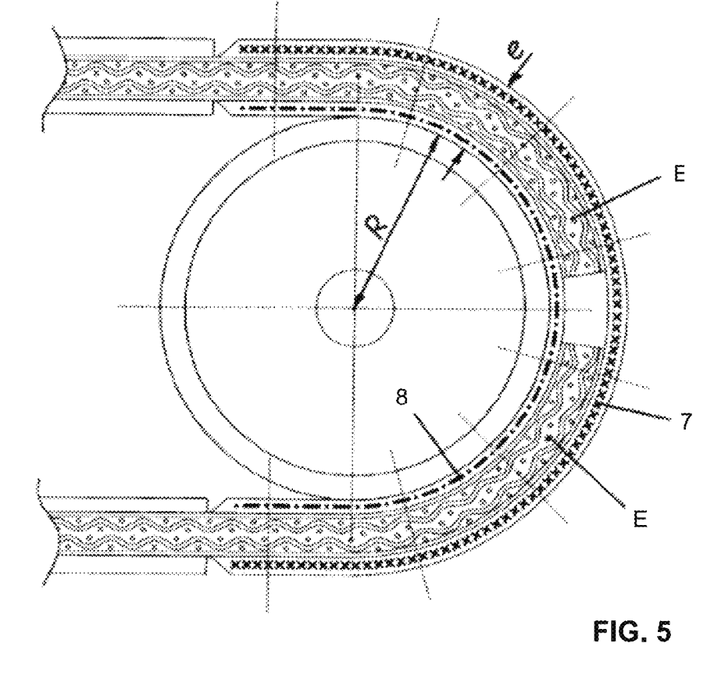
FIG. 5 shows, as a longitudinal cross-section, the device for linking of FIG. 3, mounted on the ends of a conveyor belt, passing on a deflection roller.

FIG. 5 shows the passage on a deflection roller of the device for linking of FIG. 3. It is clear that the highly extendable armature 7 has yielded, by being extended by the difference in travel between that of the lower plate and that of the upper plate, with the inextensible armature 8 not being extended, or practically not. The reference R indicates the radius of the roller, the reference e indicates the thickness of the device for linking, the reference E the ends of the conveyor belt whereon the device for linking is mounted.

Figure 6:
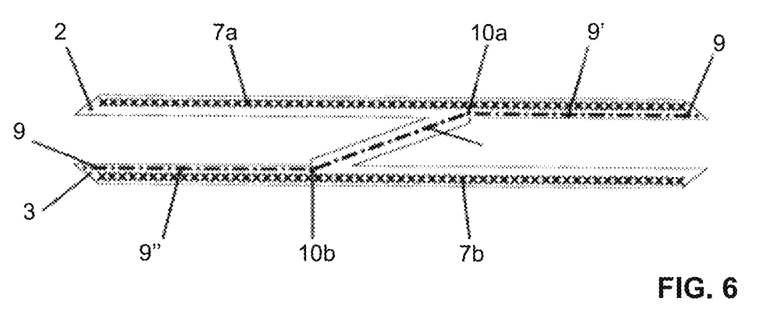
FIG. 6 shows as a longitudinal cross-section a second device for linking according to the present disclosure.

FIG. 6, showing a second device for linking according to the present disclosure, makes it possible to see it mounted on a conveyor belt, passing on a deflection roller, as a cross-section, an armature 7a highly extendable being arranged in the upper plate 2 and another armature, highly extendable 7b being arranged in the lower plate 3. A third flexible and inextensible armature 9 connects, by being integral with them by the material with which it is coated, the upper plate 2 and the lower plate 3, a portion 9' of this armature 9 being integral with one of the sides, the left side 3', of the upper face of the lower plate, another portion 9'' of this armature 9 being integral with the other side, the right side 2', of the lower face of the upper plate 2, a slanted central portion 9''' for connecting of said third armature 9 connecting the two portions 9' and 9'' by forming two pseudo-hinges 10a, 10b on the connecting zones with respectively the upper plate 2 and the lower plate 3.

Figure 7A:
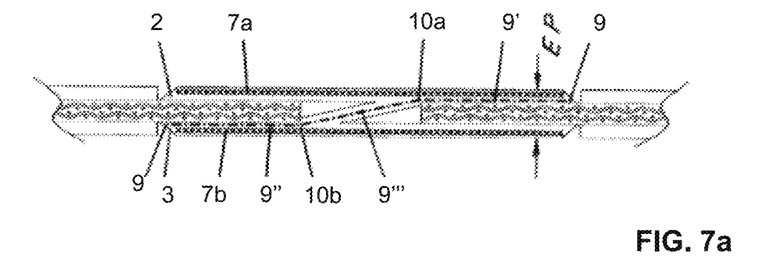
FIG. 7a shows the device for linking of FIG. 6, mounted on the ends of two conveyor belts of one thickness.
Figure 7B:
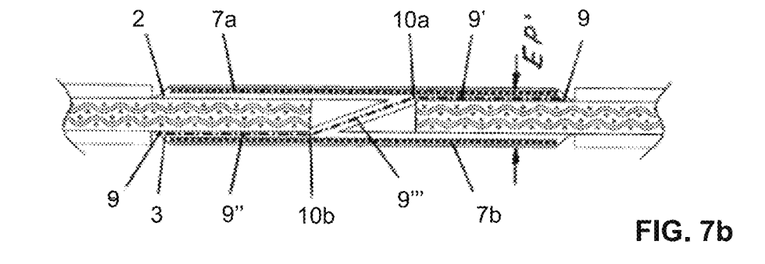
FIG. 7b shows the device for linking of FIG. 6, mounted on the ends of two conveyor belts of another thickness.

FIGS. 7a and 7b show, in view 7a, the device for linking of FIG. 6 mounted on a conveyor belt of a first thickness EP and, view 7b, the same device for linking of FIG. 5 mounted on a conveyor belt of a second thickness EP', greater. It is understood that this adaptation can be made thanks to the pseudo-hinges 10a, 10b that authorise a coming together, or a separation, of the plates 2, 3. Note that this device for linking can be reversed, the notion of upper plate and of lower plate being used only for the description.

Figure 8:
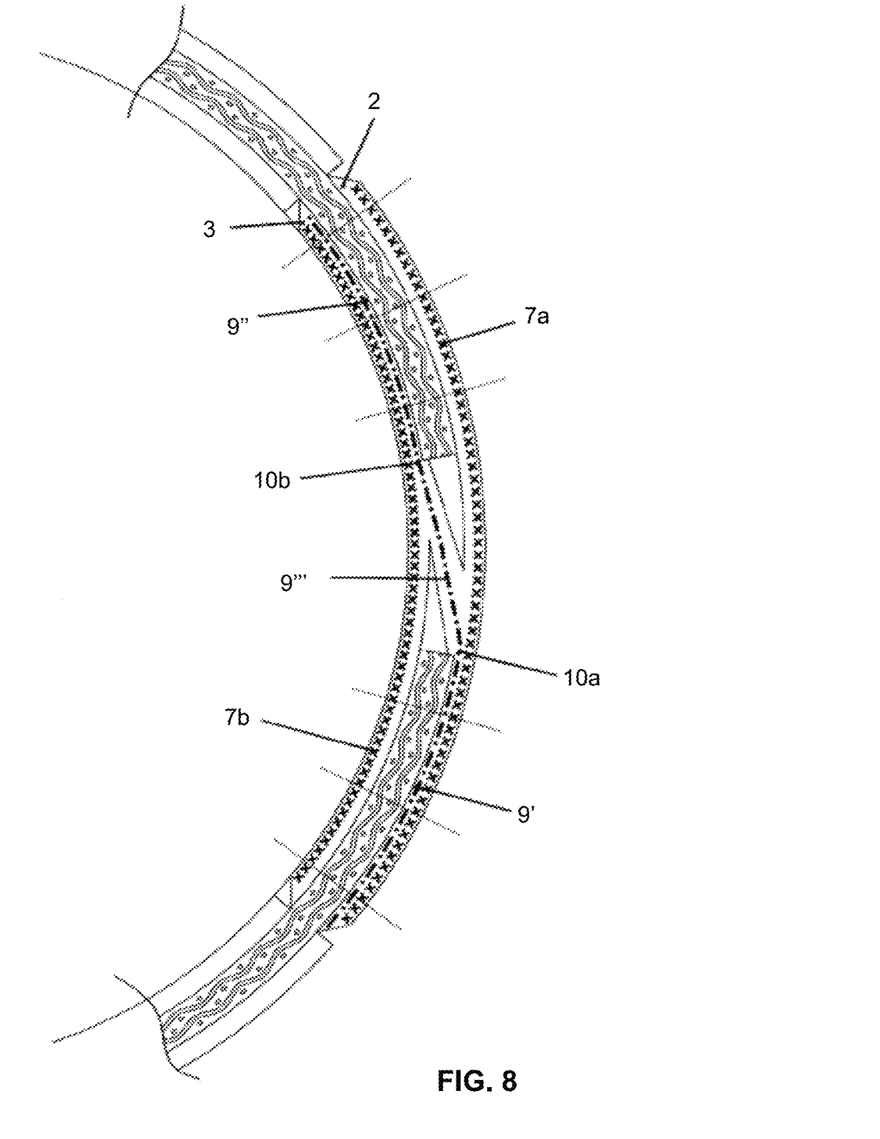
FIG. 8 shows the device for linking of FIG. 6 mounted on a conveyor belt, passing on a deflection roller.

FIG. 8 shows the device for linking of FIG. 6 mounted on a conveyor belt, passing on a deflection roller. All of the elements of FIG. 6 are found, namely the plates 2, 3, the extendable armatures 7a, 7b, the inextensible armature 9 and its various portions 9', 9'', and 9'''.

The differences in travel are absorbed thanks to the extendable armatures 7a and 7b. The transmission of force is provided by the inextensible armature 9.

As such are achieved all of the purposes pursued by the present disclosure, i.e. a certain increase in the service longevity of devices for linking according to the present disclosure and the adaptability for mounting on conveyor belts of different thicknesses of a device for linking which, in addition, has the advantage of being able to be reversed, i.e. able to be mounted without the risk of an error in positioning the plates.

A large variety of modifications have been described and more are part of the knowledge of the person skilled in the art. These and further modifications as well as any replacement by technical equivalents may be added to the description and figures, without leaving the scope of the protection of the disclosure and of the present patent.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A device for linking conveyor belts comprising:
   an upper plate and a lower plate, each of the upper and lower plate made of at least one of an elastomer and a synthetic material, the upper and lower plates comprising armatures,
   wherein the upper plate is arranged against outer faces of ends of the conveyor belts; and
   the lower plate is arranged against inner faces of the ends of the conveyor belts,
   wherein the armatures of the upper and lower plates have different extendability and compressibility in a direction parallel to a longitudinal direction of the conveyor belts and include a first armature and a second armature, so that the first armature has an extendability of greater than 15%, and the second armature has an extendability of less than 3%, and
   wherein an extendability limit of the first armature under an effect of forces of traction is not reached before, under an effect of equivalent forces of traction, a rupture of the second armature occurs.

2. The device for linking according to claim 1, wherein the second armatures are at least one of inextensible and quasi inextensible and are selected from the group consisting of a weaving of at least one of inextensible and quasi inextensible metal cables, of at least one of inextensible and quasi inextensible wires, and of at least one of inextensible and quasi inextensible filaments made of synthetic material.

3. The device for linking according to claim 2, wherein edges of the weaving used for making the second armatures are arranged perpendicularly to a direction of travel of the conveyor belts, with the device for linking being mounted on the conveyor belts.

4. The device for linking according to claim 1, wherein the extendability of the first armatures range up to about 20%.

5. The device for linking according to claim 1, wherein the first armature of the upper plate is extendable and compressible in the longitudinal direction, while the second armature of the lower plate is at least one of inextensible and quasi inextensible in the longitudinal direction.

6. The device for linking according to claim 1, wherein the first armatures of the upper plate and of the lower plate are extendable and further comprising a third armature that is at least one of inextensible and quasi inextensible and is integral with at least one of an upper face of a left side and a right side of the lower plate, and is integral with a lower face of at least one of a right side and a left side of the upper plate,
   and further comprising a slanted central portion for connecting said third armature to the upper and lower plates by forming two pseudo-hinges on connecting lines with the upper plate and the lower plate.

* * * * *